Patented Dec. 3, 1940

2,224,058

UNITED STATES PATENT OFFICE 2,224,058

PROCESS FOR THE MANUFACTURE OF KETONES OF THE CYCLOPENTANOPOLY-HYDROPHENANTHRENE SERIES AND THEIR ENOL DERIVATIVES

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application May 3, 1938, Serial No. 205,781. In Switzerland June 5, 1937

4 Claims. (Cl. 260—397)

It has been found that ketones of the cyclopentanopolyhydrophenanthrene series or their enol derivatives can be obtained by treating compounds of this series which have at the carbon atom 17 the grouping

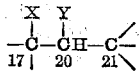

wherein X stands for a hydroxyl or acyloxy group and Y stands for a free, an esterified or etherified hydroxyl group, with agents capable of splitting off HX, and if desired, with hydrolizing agents.

Suitable parent materials are derived, for example, from saturated or unsaturated dimethyl or monomethyl cyclopentanopolyhydrophenanthrenes of any steric configuration. As mentioned above, to the carbon atom 20 of the parent materials is attached a free hydroxyl group, a hydroxyl group esterified for example by a fatty acid, an aromatic or fatty aromatic carboxylic acid or a hydrohalic acid, or a hydroxyl group etherified for example by methanol, cyclohexanol or triarylcarbinol. The three valences of the carbon atom 21 may be occupied in any manner, for example by hydrogen, substituted or unsubstituted hydrocarbon or carboxyl groups, cyanogen groups and particularly also by free, esterified or etherified hydroxyl groups. For the rest the ring skeleton of the parent materials may contain any substituents. Thus, one may use, for example, compounds derived from $\Delta^{5,6}$-3-hydroxy-, $\Delta^{4,5}$-3-keto-11-hydroxy-, $\Delta^{5,6}$-3:4-dihydroxy-, $\Delta^{4,5}$-3:6-dihydroxy-pregnenes, 3:4:5-trihydroxy-, 3:4:6-trihydroxy-, 3:5:6-trihydroxy-, 4-, 5- or 6-hydroxy-3-keto-pregnanes or -allopregnanes. Finally, one may start from such compounds of the cyclopentanopolyhydrophenanthrene series which under conditions of working, for example under the action of acids, yield the parent materials named in claim 1 as intermediate products, for example products of addition of oxygen at 17-hydroxy-17-ethenyl compounds.

The elimination of HX may be effected by agents known to be suitable for such reactions, for example by reaction of mineral acids, frequently in alcohol solution or for example in dioxane, of phosphorus oxychloride, bisulfates, of formic acid, oxalic acid, of acid anhydrides, such as acetic anhydride or phosphorus pentoxide, by the action of catalysts, such as iodine on the one hand, or by basic agents such as alkali metals or alkaline earth metals or their hydroxides and carbonates, tertiary amines or carbonates on the other hand. Instead of the indicated agents or in combination therewith there are also used appropriate measures, for instance raised temperature, particularly in indifferent gases or under reduced pressure.

The present process proceeds therefore according to the following scheme of reaction:—

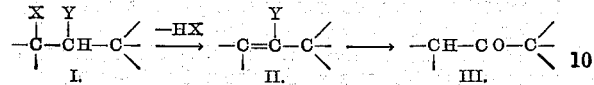

There are thus formed from free secondary alcohols (Formula I, Y=OH) mainly free enol compounds (Formula II, Y=OH), which, being unstable as such, are re-arranged into the corresponding ketones (III) or are tautomeric with them. When starting from esterified or etherified secondary alcohols there are obtained enol derivatives which may be hydrolized to the desired ketones in known manner, for example with alkaline or acid agents. Particularly in case Y stands for halogen, the compound of the Formula II is advantageously re-esterified prior to the treatment with hydrolizing agents, for example by means of salts of carboxylic acids.

If in the parent material there is a free, an esterified or etherified hydroxyl group Y at $C_{21}$, there are obtained according to the new process ketols, for example of the formula

or their enol derivatives. Also such ester and ether groups may be saponified by the known methods indicated above, if necessary after re-esterification; in this case regard must be had to the high sensitivity of the ketol to alkalies.

In addition to the elimination of HX according to the process, an analogous reaction may occur simultaneously at other points of the molecule, for example hydroxyl groups in the rings A and B or in 11-position may be eliminated in the form of water, or ester groups in the form of acids.

The compounds obtained according to the present process may find use in therapeutics or serve as intermediate products for the manufacture of therapeutically valuable compounds.

The following examples illustrate the invention, the parts being by weight:

Example 1

1 part of $\Delta^{4,5}$-11:17:20:21-tetrahydroxy-pregnenone-(3) is mixed with 60 parts of propyl alcohol and 5 parts of sulphuric acid of 30% strength and the mixture is boiled under reflux for 20 minutes. It is then poured into water and the whole is extracted with ether; the ethereal solution is washed with water, dried and evaporated in a vacuum. By fractional crystallisation of the residue from dilute alcohol, if necessary after separating the di-keto fraction by means of a carbonyl reagent, for example a basically substituted acetic acid hydrazide, there is obtained the $\Delta^{4,5}$-11:21-dihydroxy-pregnendione-(3:20) of formula

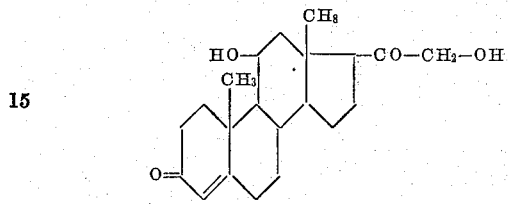

which melts at 182–184° C. and is very active in the survival test with rats which have been subjected to an adrenalectomy.

Instead of with alcoholic sulfuric acid the elimination of water may also be effected for example with sulfuric acid in dioxane or by heating with potassium bisulfate. By particularly energetic action also the hydroxyl group in 11-position may be eliminated in the form of water.

If instead of $\Delta^{4,5}$-11:17:20:21-tetrahydroxy-pregnenone-(3) one starts from its 21-esters or 21-ethers, for example, the acetate, propionate valerate, palmitate or benzoate, there are formed directly the corresponding 21-esters or 21-ethers of the $\Delta^{4,5}$-11:21-dihydroxy-pregnendione-(3:20).

In analogous manner there are obtained for example 3:11:21 - trihydroxy - allo - pregnanone-(20), $\Delta^{5,6}$-3,21-dihydroxy-pregnenone-(20) as well as $\Delta^{4,5}$-21-hydroxy-pregnendione-(3,20) or their derivatives, for instance esters or ethers.

*Example 2*

1 part of the mixture of $\Delta^{5,6}$-3:4:17:20:21- and $\Delta^{4,5}$-3:6:17:20:21-pentahydroxy-pregnenes, which is obtained by the action of selenium dioxide on $\Delta^{5,6}$-3:17-dihydroxy-21-oxo-pregnene and subsequent reduction, is heated with 100 parts of alcohol and 6 parts of concentrated hydrochloric acid for half an hour at 60° C., water is then added to produce a precipitate and the whole is extracted with ether. The ethereal solution is washed with a solution of bicarbonate of soda and water, dried and evaporated. The residue is purified by means of a carbonyl reagent or by selective adsorption and crystallized fractionally from dilute methanol. There is thus obtained $\Delta^{4,5}$-21-hydroxy-pregnendione-(3,20) of the formula

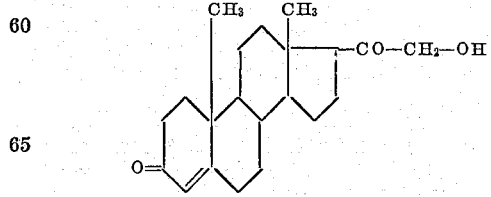

which melts at 139–141° C. and is active in preserving the life of rats from which the suprarenal capsules have been removed.

The same compound is obtained when 3:5:6:17:20:21 - hexa - hydroxy - pregnanes are treated in analogous manner.

The above mentioned $\Delta^{5,6}$-3:17-dihydroxy-21-oxo-pregnene can be obtained from trans-dehydroandrosterone for example by condensing with bromo acetic ester in the presence of zinc, converting the hydroxy acid formed into the hydroxy acid chloride, and subsequently reducing the acid chloride group to the aldehyde group with aid of hydrogen in the presence of a palladium-bariumsulfate catalyst.

*Example 3*

1 part of 3-epi-allo-pregnane-triol-(3:17:20) is treated for ½ hour for eliminating the water with 50 parts of a boiling hydrochloric acid of 10 per cent. strength in methyl alcohol, the mixture is diluted with water, whereupon the acid is neutralized, the whole is extracted by ether, the ethereal solution is washed with a solution of bicarbonate of sodium and water, then dried and evaporated. By recrystallization from dilute alcohol, sublimation or selective adsorption the residue yields the epi-allo-pregnanol-(3)-one-(20) of the formula

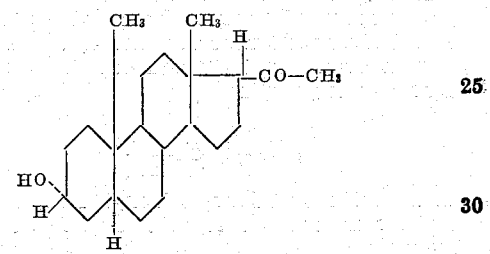

which melts at 172° C.

By heating in analogous manner 3-trans-allo-pregnane-triol-(3:17:20) for 2 hours with 40 parts of 4 n sulfuric acid in 100 parts of methanol there is obtained allo-pregnanol-(3)-one-(20) which may be purified for example by means of carbonyl reagents, chromatography and/or recrystallization and melts at 197° C.

The parent material 3-epi-allo-pregnane-triol-(3:17:20) may be prepared from cis-androsterone by addition of acetylene in the presence of ammonia, partial reduction of the triple to a double bond, treatment with perbenzoic acid and reduction with sodium in hot propyl alcohol.

*Example 4*

1 part of 5:17:20-trihydroxy-pregnanone-(3) is boiled in a reflux apparatus for 20 minutes with 60 parts of propyl alcohol and 5 parts of sulfuric acid of 30 per cent. strength. It is then poured into water, and the whole is extracted with ether, the ethereal solution is washed with water, dried and evaporated in a vacuum. From the residue there is obtained, in usual manner, for example over the difficultly soluble disemicarbazone, by sublimation, fractional crystallization and/or selective adsorption, the progesterone of the formula

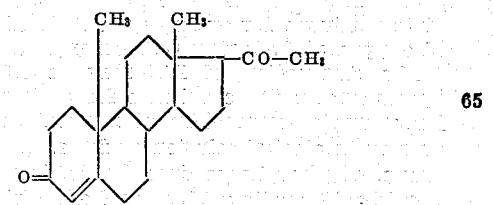

which crystallizes from dilute alcohol in dimorphous modifications melting at 120° or 129° C.

The known $\Delta^5$-pregnenol-(3)-one-(20) is obtained in analogous manner from $\Delta^5$-3:17:20-trihydroxy-pregnene.

The parent material 5:17:20-trihydroxy-pregnanone-(3) may be prepared from trans-dehydroandrosterone by addition of acetylene, partial reduction of the triple to a double bond, treatment with perbenzoic acid, reduction in presence of palladium black as catalyst, acylation, partial saponification to the free 3-hydroxy compounds, which is oxidized to the 3-keto compound, and then saponification of the still esterified 20-hydroxy group.

The parent compounds hereinbefore enumerated and the methods for the preparation thereof per se constitute no part of the present invention proper and no claim is made in the present application to such compounds or to such methods of preparation since, as to the present application, these belong to the prior art. The present invention begins where this prior art leaves off, i. e. with the manipulation of the said parent compounds to produce new and different products.

What we claim is:

1. Process for the manufacture of ketones of the cyclopentano-polyhydrophenanthrene series and their enol derivatives, which comprises reacting compounds of this series which have at the carbon atom 17 the grouping

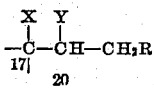

wherein X and Y are members of the group consisting of hydroxyl and acylated hydroxyl and R is a member of the group consisting of hydrogen, a hydrocarbon radical, a free, esterified and etherified hydroxyl, with a member of the group consisting of water- and acid-eliminating agents.

2. Process according to claim 1, which comprises reacting the reaction products with hydrolizing agents.

3. Process for the manufacture of ketones of the cyclopentanopolyhydrophenanthrene series and their enol derivatives, which comprises reacting compounds of this series which have at the carbon atom 17 the grouping

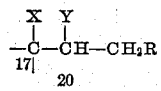

wherein X and Y are members of the group consisting of hydroxyl and acylated hydroxyl, and R is a member of the group consisting of free, esterified and etherified hydroxyl, with a member of the group consisting of water- and acid-eliminating agents.

4. Process for the manufacture of ketones of the cyclopentanopolyhydrophenanthrene series and their enol derivatives, which comprises reacting compounds of this series which have at the carbon atom 17 the grouping

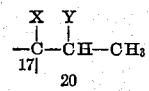

wherein X and Y are members of the group consisting of hydroxyl and acylated hydroxyl, with a member of the group consisting of water- and acid-eliminating agents.

KARL MIESCHER.
ALBERT WETTSTEIN.